US011639062B2

(12) United States Patent
Zapata

(10) Patent No.: US 11,639,062 B2
(45) Date of Patent: May 2, 2023

(54) TEXTILE PRINTING

(71) Applicant: Hewlett-Packard Development Company, L.P., Spring, TX (US)

(72) Inventor: Maria Elizabeth Zapata, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/050,927

(22) PCT Filed: Aug. 2, 2018

(86) PCT No.: PCT/US2018/044980
§ 371 (c)(1),
(2) Date: Oct. 27, 2020

(87) PCT Pub. No.: WO2020/027842
PCT Pub. Date: Feb. 6, 2020

(65) Prior Publication Data
US 2021/0237469 A1    Aug. 5, 2021

(51) Int. Cl.
*B41J 29/393* (2006.01)
*B41J 2/21* (2006.01)
*B41J 3/407* (2006.01)
*H04N 1/60* (2006.01)
*H04N 1/00* (2006.01)
*D06P 5/30* (2006.01)

(52) U.S. Cl.
CPC .......... *B41J 2/2132* (2013.01); *B41J 2/2114* (2013.01); *B41J 3/4078* (2013.01); *B41J 29/393* (2013.01); *D06P 5/30* (2013.01); *H04N 1/00045* (2013.01); *H04N 1/00087* (2013.01); *H04N 1/6033* (2013.01); *B41J 2203/011* (2020.08)

(58) Field of Classification Search
CPC .......................... B41J 3/4078; B41J 2203/011
See application file for complete search history.

(56) References Cited
U.S. PATENT DOCUMENTS

| 5,877,797 | A  | 3/1999  | Miyashita |
| 5,936,741 | A  | 8/1999  | Burns     |
| 6,721,061 | B1 | 4/2004  | Allen     |
| 7,607,745 | B2 | 10/2009 | Ben-Zur   |
| 9,107,462 | B1 | 8/2015  | Heinrich  |
| 9,516,288 | B2 | 12/2016 | Holub     |
| 9,868,302 | B1 | 1/2018  | Ibrahim   |

(Continued)

FOREIGN PATENT DOCUMENTS

| CN | 103552389 | 2/2014 |
| CN | 106585124 | 4/2017 |

(Continued)

*Primary Examiner* — Julian D Huffman

(57) ABSTRACT

Textile printing wherein the printing comprises: acquire, by a controller, a print job comprising an image and a set of print parameters; position a textile in a printing zone; acquire a calibration image of the textile and transferring the calibration image to the controller; determine, by the controller, a set of calibrated print parameters based on the calibration image and the set of print parameters; and print the image on the textile using the set of calibrated print parameters.

14 Claims, 4 Drawing Sheets

(56) References Cited

U.S. PATENT DOCUMENTS

| | | | |
|---|---|---|---|
| 2004/0239705 A1* | 12/2004 | Arikita | B41J 3/4078 |
| | | | 347/5 |
| 2006/0033796 A1 | 2/2006 | Samii et al. | |
| 2010/0092677 A1* | 4/2010 | Ozawa | B41J 3/4078 |
| | | | 347/102 |
| 2017/0210581 A1* | 7/2017 | Van Acquoij | B65H 85/00 |
| 2018/0022131 A1 | 1/2018 | Klinger | |
| 2018/0178550 A1* | 6/2018 | Kremers | B41J 11/008 |

FOREIGN PATENT DOCUMENTS

| | | | |
|---|---|---|---|
| CN | 108177438 | 6/2018 | |
| JP | 2005-045644 A | 2/2005 | |
| WO | WO-2013161622 A1 * | 10/2013 | B41J 3/4078 |
| WO | WO-2016050696 | 4/2016 | |

* cited by examiner

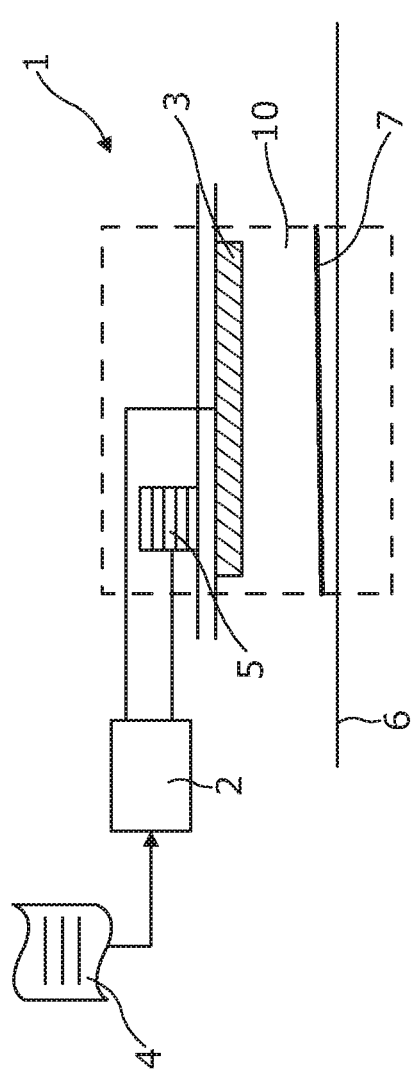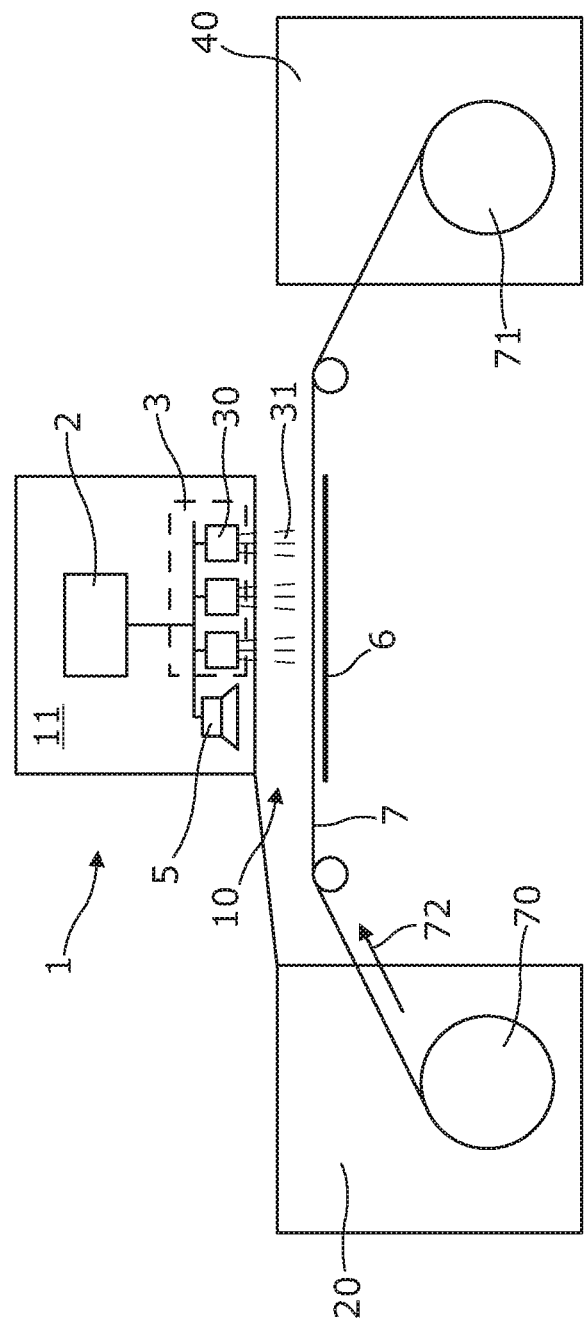

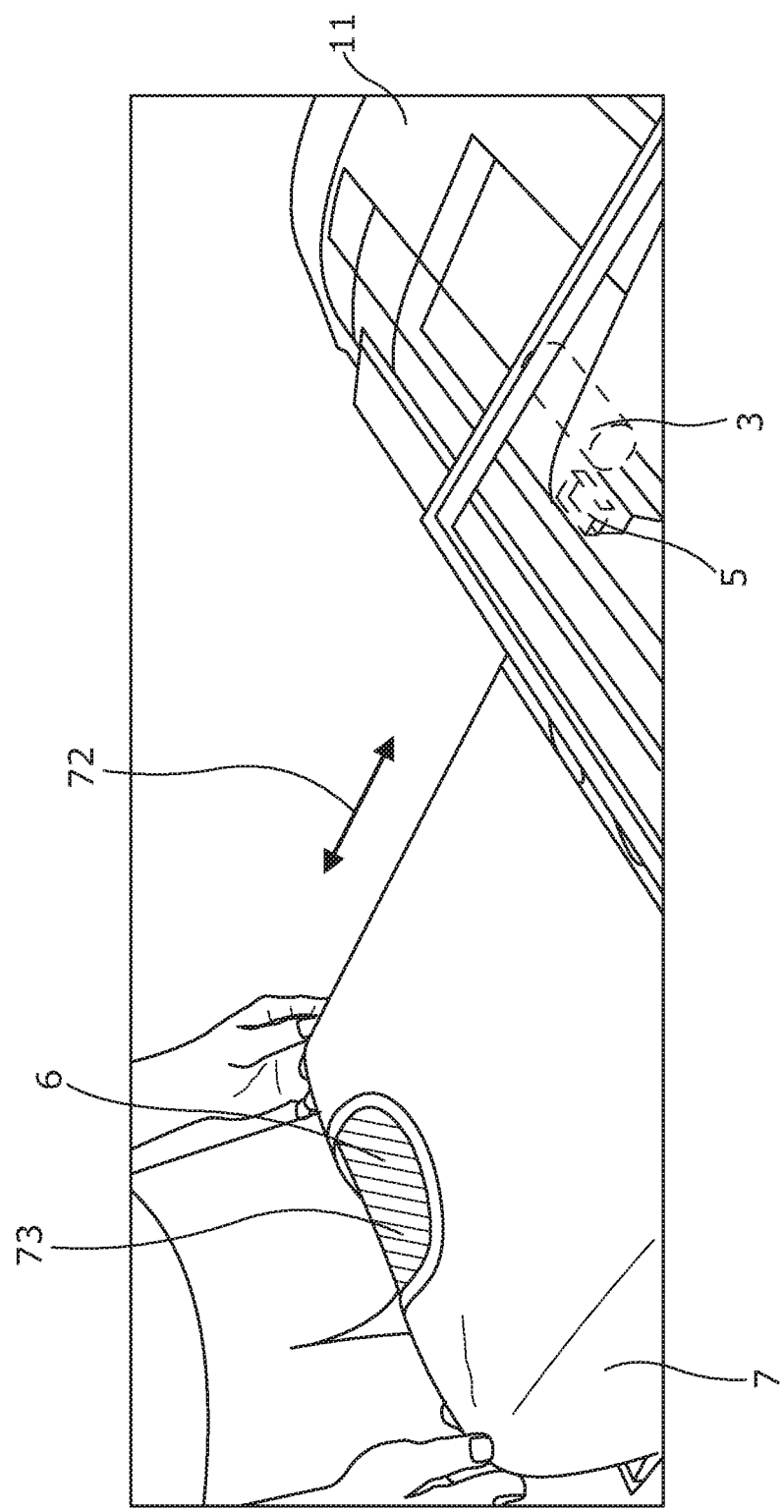

TEXTILE PRINTING

BACKGROUND

Printers are, in general terms, devices that modify a substrate as to incorporate an image. In particular, fluid-based printers are fluid ejection devices that transfer a printing fluid such as an ink from a storage to form an image on the substrate. In the case wherein the substrate is a textile and, more specifically a garment, the printing performed on such a type of substrate is known as direct-to-garment printing.

BRIEF DESCRIPTION OF THE DRAWINGS

Various example features will be apparent from the detailed description which follows, taken in conjunction with the accompanying drawings, wherein:

FIG. 1 schematically illustrates a printing system according to an example.

FIG. 2 schematically illustrates a printing system for roll-to-roll type of textile according to an example.

FIG. 3 shows an example of a direct-to-garment printing system according to an example.

DETAILED DESCRIPTION

Figure 4:
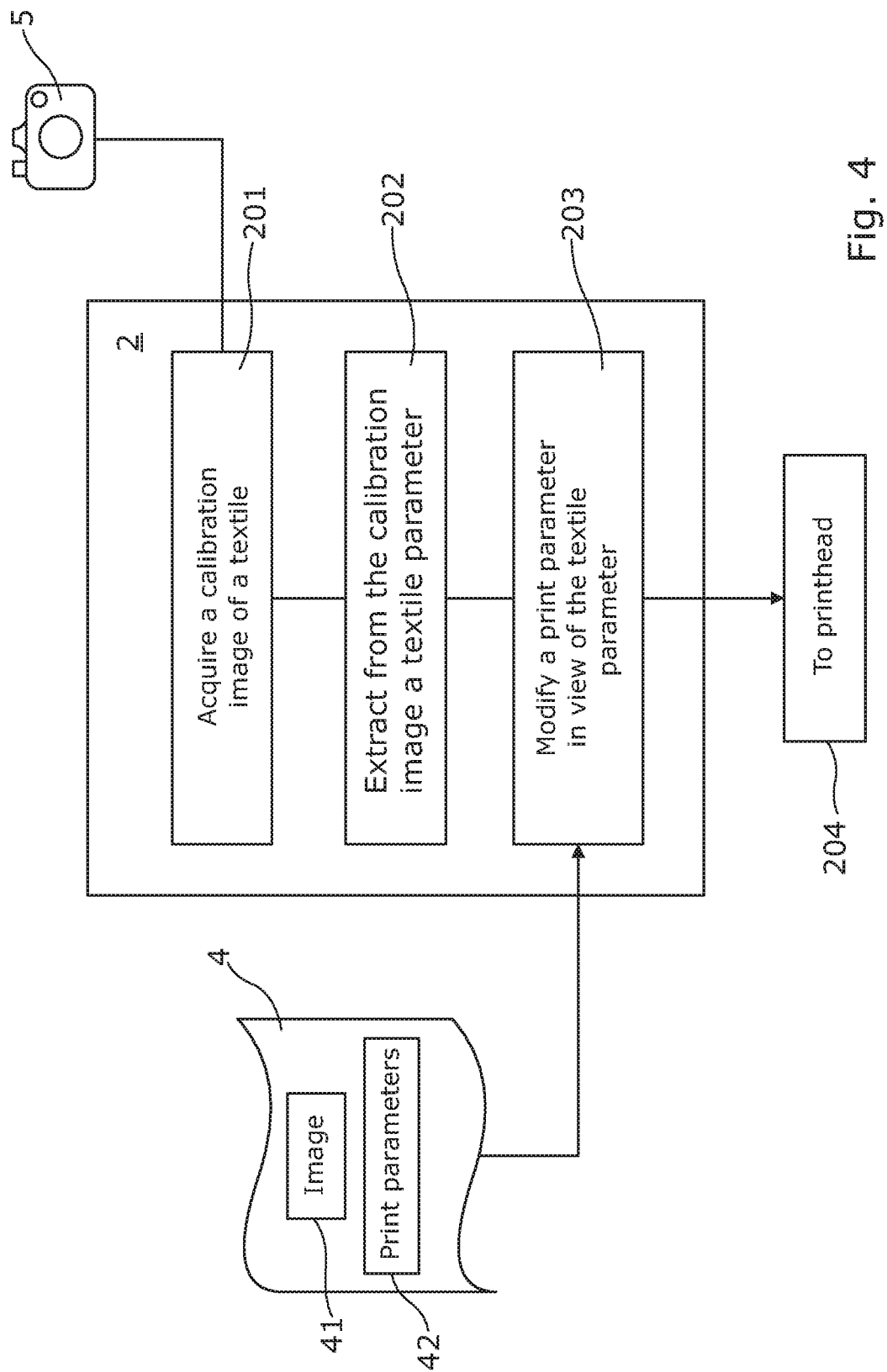
FIG. 4 shows an example of flowchart of a textile printing method.

The following description is directed to various examples of the disclosure. In the foregoing description, numerous details are set forth to provide a thorough understanding of the examples disclosed herein. However, it will be understood by those skilled in the art that the examples may be practiced without these details. While a limited number of examples have been disclosed, those skilled in the art will appreciate numerous modifications and variations therefrom. It is intended that the appended claims cover such modifications and variations as fall within the scope of the examples. Throughout the present disclosure, the terms "a" and "an" are intended to denote at least one of a particular element. In addition, as used herein, the term "includes" means includes but not limited to, the term "including" means including but not limited to. The term "based on" means based at least in part on.

As mentioned above, inkjet printers are systems that create a printed image by propelling printing fluid through nozzles to substrate pixels. The printing fluid drops may have printing fluid pigments and are stored in a printing fluid repository. The accuracy in which the printing fluid drops are placed in the substrate pixels may lead to a better print job quality or image quality (IQ). Precisely, printers may use printing masks to select which nozzles from a printhead should eject printing fluid on each pixel from the substrate.

In an example, Direct to Garment printing (DTG) employ direct sublimation and use a specialized ink jet technology. DTG printers may hold the garment in a fixed position, and use specialty inks that are applied to the textile directly by the print head and are absorbed by the garment's fibers.

Textile printing and, especially DTG, presents several technical challenges that are to be overcome, e.g., loading the substrate and holding it in a fixed position may be performed manually or with high variability between substrates and, therefore, the printer may comprise means to accommodate such variability between the positions of each substrate within printer, variability of orientations and in a further scenario also a variability on types of substrates or even types of materials.

In particular, a textile printing system is disclosed wherein the textile printing system comprises:
- a controller to receive a print job comprising an image and a set of print parameters;
- a printhead controllable by the controller and positioned over a print zone, to transfer a print fluid on a textile corresponding to the print job; and
- an image acquisition device to obtain a calibration image of the textile before the transfer of the print fluid to the textile;

wherein the controller is to receive the calibration image and to determine a print parameter of the set of print parameters in view of the calibration image.

In an example, the system may also comprise a loading station for loading a textile in a load zone, and an advancing mechanism to transfer the textile from the load zone to the print zone, being the image acquisition device to obtain the calibration image in the load zone, in the print zone and/or between the load zone and the print zone, i.e., upstream the print zone or while in the print zone.

In an example, the loading station may be to continuously load the textile in a roll format and wherein the advance mechanism comprises a pulling mechanism of the textile such as, e.g., utilizing a drive roller. In another example, the loading station is to load the textile in discrete pieces and wherein the advance mechanism comprises a transfer surface that comprises a textile attachment element and is to move together with the textile between the load zone and the print zone. The textile attachment element may be, e.g., a frame associated to a section (e.g., the edges of the transfer surface) thereby fixing the textile to the section transfer surface. Also, the textile attachment element may comprise a vacuum member to fix the textile to the transfer surface.

In a further example, the textile is a garment.

Moreover, the controller may be to determine from the calibration image at least one of: a weave pattern, a weave alignment, an identification mark, a color, a size, a material or textile features such as, for example, the presence of elements that may not be acceptable for a print like the presence of tear or a knot in the weave and the controller may, e.g., issue a warning signal or abort a print job upon the presence of such features. Such features obtained from the calibration image may also be known as textile parameters. As mentioned above, the controller may also receive a print job that comprises a set of printing parameters such as, e.g., space between the printhead and the textile (or, as known in the field, pen-to-substrate space PSS), position of the image, scale of the image, shape of the image, ink quantity, print mode, or undercolor application. Subsequently, the controller may establish a set of calibrated print parameters in view of the set of print parameters and the textile parameters, wherein the calibrated print parameters may comprise at least a modified parameter of the originally received set of print parameters.

In an example, the shape of the image comprises modifying the image as to avoid printing in a section of the textile upon a detection in the calibration image, e.g., of buttons.

Additionally, the image acquisition device may obtain a quality image after the transfer of print fluid to the textile. In an example the quality image and the calibration image are obtained by independent devices within the image acquisition device, e.g., a camera may be to obtain the calibration image and another camera may be to obtain the quality image wherein the calibration image is obtained upstream the print and the quality image is obtained downstream the print. In a further example, both the calibration image and the quality image are obtained by the same image acquisition device. The controller may also assign the textile a quality status in view of the quality image, e.g., acceptable or not acceptable and may issue a signal associated to the status of the textile.

Also, it is disclosed a method to print an image on a textile, comprising:
- acquire, by a controller, a print job comprising the image and a set of print parameters;
- position a textile in a printing zone;
- acquire a calibration image of the textile and transferring the calibration image to the controller,
- determine, by the controller, a set of calibrated print parameters based on the calibration image and the set of print parameters; and
- print the image on the textile using the set of calibrated print parameters.

In such a method the controller may also determine, from the calibration image, at least one of a weave pattern, a weave alignment, an identification mark, a color, a size, or a material. In a further example, the controller may obtain a textile parameter to determine whether the textile is in condition to be printed, if it is not, the controller may print while issuing a warning to the user or cancel the print job.

In an example, the print parameter is at least one of space between the printhead and the textile, position of the image, scale of the image, shape of the image, ink quantity, print mode, type of pre or post processing to apply or undercolor application.

Also, it is disclosed a non-transitory machine-readable medium storing instructions executable by a controller, the non-transitory machine-readable medium comprising instructions to:
- receive from an image acquisition device a calibration image of a textile to be printed using an inkjet printer,
- receive a print job comprising an image and a set of print parameters;
- determine from the calibrated image a set of textile parameters;
- modify the set of print parameters in view of the textile parameters thereby obtaining a set of calibrated parameters
- send instructions to print the image on the textile using the set of calibrated parameters.

In an example, the sending of instructions to print the image on the textile using the set of calibrated parameters may involve printing while issuing a warning to the user or aborting a print.

Referring now to the drawings, FIG. 1 shows a textile printing system 1 that comprises a printhead 3 located over a print zone 10. In an example, the printhead may be part of an inkjet printer, i.e., may comprise a controllable fluid ejection device that propels droplets of printing fluid from a nozzle to form an image on a substrate wherein such propelling can be achieved by different technologies such as, e.g., thermal injection or piezo injection. In the printing system 1 of FIG. 1, the substrate may be a textile 7, e.g., a textile sheet, a textile roll or a garment.

The printing system 1 is to receive a print job 4 selected by a user, the print job 4 is to be printed onto the textile 7 by the printhead 3. A controller 2 may be to receive the print job 4 from the user and to send instructions to the printhead 3 accordingly. In an example, the print job comprises an image together with a set of print parameters.

The controller 2 may be a combination of circuitry and executable instructions representing a control program to perform the operations described herein.

The printing system 1 may also comprise an image acquisition device 5 wherein such device may be to obtain a calibration image of the textile 7, i.e., an image used to configure at least a parameter of the printing system. The controller 2 may receive such a calibration image and determine a set of calibrated print parameters based on data obtained in the calibration image. The set of calibrated print parameters may be a modification of the originally received set of print parameters, e.g., the controller 2 may modify a parameter of the set of parameters in view of the calibration image thereby obtaining a set of calibrated print parameters.

Furthermore, the substrate 6 may be positioned over a support surface 6 that helps provide stability and that may provide for movement of the textile 7 from and towards the print zone 10.

FIG. 2 shows an example of a roll-to-roll system wherein the textile 7 is loaded in a load zone 20 in the form of an input roll 70 and, after printing, collected in an output roll 71 format in a finish zone 40.

In the example of FIG. 2 the input roll 70 is loaded in an input roller and configured so that the textile goes moves continuously from the load zone 20 through a print zone 10 and towards a finish zone 40 following a media path 72. In an example the media path 72 is substantially unidirectional and the media is moved by media advance mechanism such as, e.g., media advance rollers or the like.

In this example, the image acquisition device 5 may be positioned along the media path 72 between the input roller and the printhead 3, i.e., upstream the printhead 3. However, in other examples, the image acquisition device 5 may be located in the print zone 10 together with the printhead 3. In any case, the image acquisition device 5 is to acquire a calibration image and such an image is to be obtained before a printing process is carried out by the printhead 3, i.e., before the nozzles 30 eject marking printing fluid 31 over the textile 7. In some cases, the printing system may be to apply, as pre-processing, a non-marking fluid as pre-treatment to the textile 7, then obtain the calibration image by the image acquisition device 5 and, subsequently, print the image by ejecting the marking printing fluid 31 towards the textile. In a further embodiment, the amount and/or type of post-treatment of the textile 7 once it has been printed is selected, e.g., setting the drying or curing time.

Both, the marking and non-marking fluid may be ejected by the printhead 3 and, in an example, the calibrated image is obtained before the marking fluid is applied, i.e., before the printhead prints the image acquired by the controller.

In a further example, the printing system 1 may comprise a non-marking printhead configured to apply a pre-treatment such as a non-marking fluid, aerosol or the like and a marking printhead. In such a case the image acquisition device may be positioned upstream both, the marking and non-marking printhead or between the marking and non-marking printheads.

The controller 2 is to be connected to the printhead 3 and to the image acquisition device 5 as to be able to receive and send data to the printhead 3 and the image acquisition device, such connection may be a wired or wireless connection and the controller may be physically located in the same enclosure 11 as the printhead 3 and the image acquisition device 5 of be part of a remote controlling device.

FIG. 3 shows a further example wherein the textile 7 is loaded as discrete pieces of textile. For example, the textile may be a garment such as a shirt.

In the example of FIG. 3, the textile 7 may be loaded in a load zone outside the enclosure 11 that comprises the printhead 3. The textile 7 may be loaded by a user by locating the portion of the textile 7 to be printed on a support surface 6 and then fixing it to such a support surface by an attachment element. In an example, the attachment element may be an element to press the textile against the support surface such as a frame to press the textile on an area that is not to be printed or a vacuum associated to the support surface 6.

In the example of FIG. 3, the support surface defines a bidirectional media path 72. The user is to load the textile 7 in a load area, the textile is then fixed to the support surface 6 and the surface moves towards the printhead 3 to be printed. Once the textile 7 has been printed, the support surface 6 returns to the load area for the unloading of the printed textile and the loading of a new one.

As shown in FIG. 3, the image acquisition device 5 may be adjacent to the printhead 3, in an example, the image acquisition device may be adjacent to the printhead in the media path direction 72.

The manual loading of the textile 7 of the printing system of FIG. 3 makes it usual that the textile is not properly aligned when it enters the print zone 10. This makes the printing system not consistent between textiles 7, at least, with respect to the alignment. This problem can also be experienced in a system according to FIG. 2 wherein the textile may be subject, e.g., to skew.

Therefore, a method is disclosed in FIG. 4 wherein the controller 2 is configured to acquire a calibration image of a textile 201 by the image acquisition device. From the calibration image, the controller 2 may extract a textile parameter 202.

On the other hand, the controller 2 may also receive a print job 4 that may contain, together with an image 41 to be printed, a set of print parameters 42.

Subsequently, the controller 2 may process the textile parameters and determine if a parameter from the set of print parameters 42 needs to be modified or if further parameters need to be configured to appropriately print the image 41 on the textile 7.

Finally, the controller 2 may modify a print parameter 203 and send print instructions to the printhead 204. In a further embodiment, the controller may issue a warning signal to the user before printing if a textile parameter was detected that may affect the quality of the print and/or the integrity of the printer. Also, the controller may determine to cancel a print job accordingly.

Figure 5:
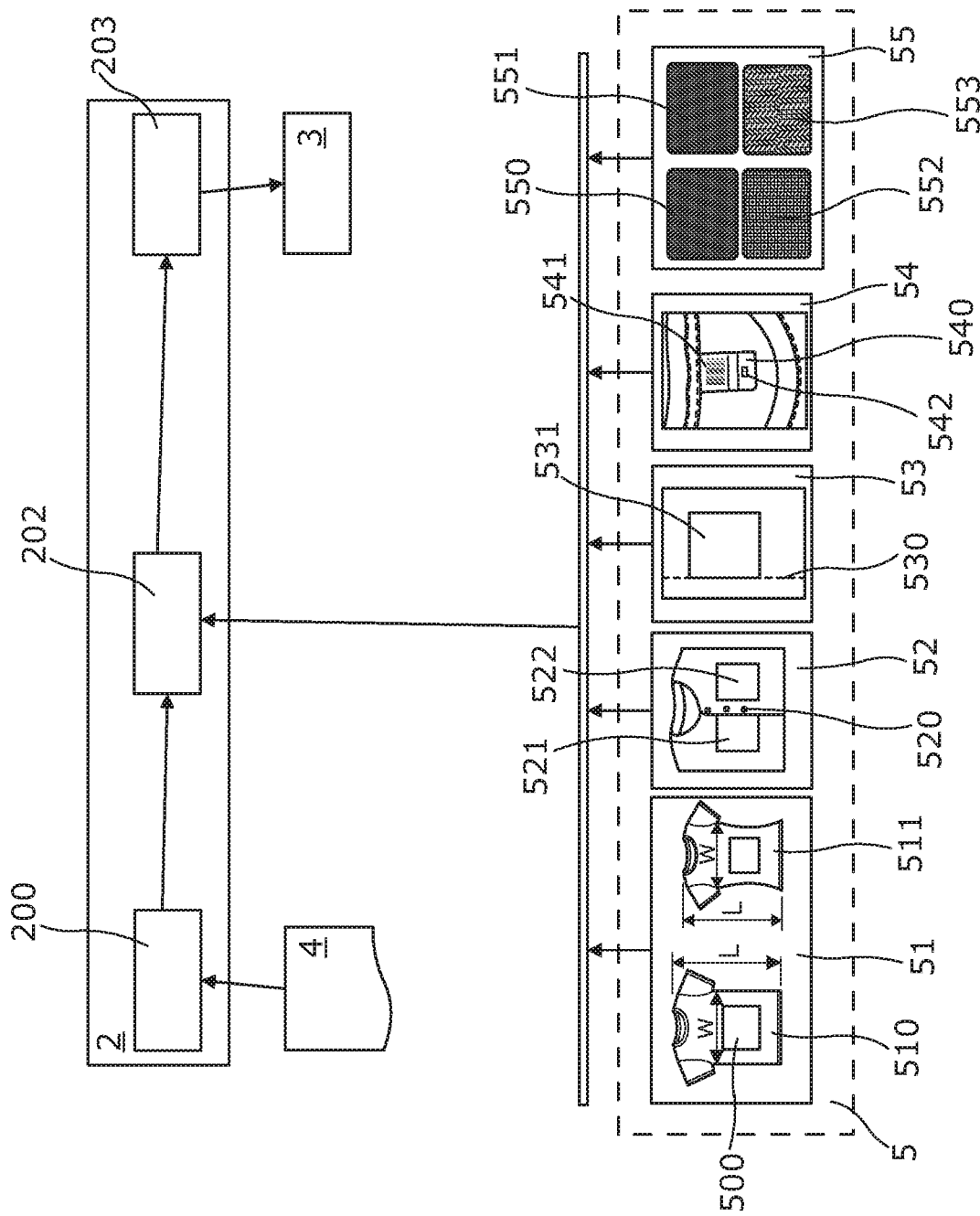
FIG. 5 shows a further example of a flowchart of a textile printing method.

Examples of print parameters 42 and textile parameters will be disclosed in more detail with reference to FIG. 5.

FIG. 5 shows an example of a method wherein the controller 2 receives a print job, further, the controller is to analyze a calibration image obtained by an image acquisition device prior to printing.

In a first example, a calibration image 51 is obtained wherein the controller 2 is to determine, as textile parameters, a width (W), a length (L) and/or a shape of the textile, e.g., if it is a straight shirt 510 or a fitted shirt 511 and determine a set of calibrated print parameters such as the position and/or scaling of the image to be printed 500 on the shirt. The calibrated print parameters may replace a set of print parameters received together with the print job 4 or may be new parameters that are to be set.

In a further example, a calibration image 52 is obtained wherein the controller 2 determines, as textile parameters, the presence of a feature, e.g., buttons 520 or a pocket 522. In such a case, the controller 2 may modify the print parameters to obtain a set of calibrated print parameters that crop the image in the section of the buttons to prevent printing over them. Also, the controller 2 may generate a set of calibrated parameters wherein the image is reshaped and dimensioned so that the image is printed over the pocket 522, also, the controller may modify the pen to substrate space (PSS) to accommodate a lower distance between the printhead 3 and the textile that is to be expected in the area of the pocket 522.

Also, the controller 2 may obtain from a calibrated image 53 the weave 530 of the textile. With this textile parameter, the controller 2 may set as calibrated print parameter a parameter to align the image to be printed 531 with the weave of the textile or with a determined inclination with respect to the weave 530.

Further examples of textile parameters that may be obtained by a controller 2 are the type of textile that is loaded. For example, the calibrated image 54 may obtain from a tag 540 or the textile a set or parameters such as reading a barcode and/or a size 542 of a garment. With this information, the controller may correlate the set of textile parameters with data from a look-up table and obtain a set of calibrated print parameters by such correlation.

Moreover, the controller 2 may determine a textile parameter, the type of textile that is to be printed, e.g., the controller may extract from the calibrated image the twill of the textile, i.e., if the twill is a right-hand twill 550, a left-hand twill 551, a chambray 552 or a broken twill 553. With this information the controller may determine the amount of ink to be used, the drop size, the amount of pre/post treatment, etc. as print parameters.

In a further example, the controller 2 may receive from the image acquisition device 5 a calibration image and determines, from such calibration image, the color of the textile as a textile parameter. In view of such a textile parameter the controller 2 may determine the need and/or type of undercolor to apply to the fabric before printing the image on it, e.g., if the textile is textile of dark color the controller 2 may determine to use a white undercolor so that colors are more visible on the image once it is printed in the textile.

Examples relate to a non-transitory machine-readable storage medium encoded with instructions executable by a processing resource of a computing device to perform methods described herein.

The preceding description has been presented to illustrate and describe certain examples. Different sets of examples have been described; these may be applied individually or in combination, sometimes with a synergetic effect. This description is not intended to be exhaustive or to limit these principles to any precise form disclosed. Many modifications and variations are possible in light of the above teachings. It is to be understood that any feature described in relation to any one example may be used alone, or in combination with other features described, and may also be used in combination with any features of any other of the examples, or any combination of any other of the examples.

The invention claimed is:

1. A textile printing system comprising:
   an image acquisition device to obtain a calibration image of a textile before transfer of print fluid to the textile;
   a printhead positioned over a print zone to transfer the print fluid onto the textile according to a print job corresponding to an image and a print parameter; and
   a controller to:
   identify, from the calibration image, a presence of a button on the textile;

and
modify the image to avoid printing on the button.

2. The system of claim 1, further comprising:
a loading station for loading the textile into a load zone; and
an advancing mechanism to transfer the textile from the load zone to the print zone,
wherein the image acquisition device is to obtain the calibration image in the load zone, in the print zone, and/or between the load zone and the print zone.

3. The system of claim 2, wherein the loading station is to continuously load the textile in a roll format,
and wherein the advance mechanism comprises a pulling mechanism for the textile.

4. The system of claim 2, wherein the loading station is to load the textile in discrete pieces, and wherein the advance mechanism comprises a transfer surface having a textile attachment element and that is to move together with textile between the load zone and the print zone.

5. The system of claim, 4 wherein the textile is a garment.

6. The system of claim 1, wherein: the print parameter is a space between the printhead and the textile, a shape of the image, an ink quality, a print mode, and/or an undercolor application.

7. The system of claim 1, wherein the image acquisition device is to further obtain a quality image after the transfer of print fluid to the textile.

8. The system of claim 7, wherein the controller is to further assign the textile a quality status in view of the quality image.

9. The system of claim 1, wherein the image acquisition device is a camera.

10. A textile printing method comprising:
receiving a print job corresponding to an image and a print parameter;
acquiring a calibration image of a textile using a camera before transfer of print fluid to the textile;
identifying, from the calibration image, presence of a button on the textile;
modifying the image to avoid printing on the button.

11. The textile printing system of claim 1, wherein the controller is to identify the presence of a tear or knot in the textile, and wherein the controller is to responsively issue a warning signal or abort the printing job.

12. The textile printing system of claim 1, wherein the controller is to identify a weave alignment of the textile,
and wherein the controller is to align the image with the weave of the textile.

13. The method of claim 10, wherein the print parameter is a space between a printhead and the textile, an ink quality, a print mode, and/or an undercolor application.

14. A non-transitory machine-readable medium storing instructions executable by a processor to cause the processor to:
receive a print job corresponding to an image and a print parameter;
acquire a calibration image of a textile to be printed using an inkjet printer;
identifying, from the calibration image, presence of a button on the textile;
and
modify the image to avoid printing on the button.

* * * * *